US011063782B2

(12) United States Patent
Haag et al.

(10) Patent No.: US 11,063,782 B2
(45) Date of Patent: Jul. 13, 2021

(54) ACCESS NETWORK WITH REMOTE ACCESS SERVERS (71) Applicant: Deutsche Telekom AG, Bonn (DE)

(72) Inventors: Thomas Haag, Rodgau (DE); Hans-Joerg Kolbe, Darmstadt (DE); Wolfgang Hurst, Langen (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 16/765,177

(22) PCT Filed: Nov. 15, 2018

(86) PCT No.: PCT/EP2018/081283
§ 371 (c)(1),
(2) Date: May 19, 2020

(87) PCT Pub. No.: WO2019/101606
PCT Pub. Date: May 31, 2019

(65) Prior Publication Data
US 2020/0351115 A1 Nov. 5, 2020

(30) Foreign Application Priority Data
Nov. 24, 2017 (EP) .................... 17203471

(51) Int. Cl.
G06F 15/16 (2006.01)
H04L 12/28 (2006.01)
(Continued)

(52) U.S. Cl.
CPC ............ *H04L 12/287* (2013.01); *H04L 45/02* (2013.01); *H04L 67/141* (2013.01)

(58) Field of Classification Search
USPC ......................................................... 709/227
See application file for complete search history.

(56) References Cited

U.S. PATENT DOCUMENTS 8,693,376 B2 * 4/2014 Ekstrom ............... H04L 67/125
370/270
9,032,083 B2 * 5/2015 Scherer ................. H04L 61/103
709/228
(Continued)

FOREIGN PATENT DOCUMENTS

EP 3209048 A1 8/2017

Primary Examiner — Anthony Mejia
(74) Attorney, Agent, or Firm — Leydig, Voit & Mayer, Ltd.

(57) ABSTRACT

A method includes: a controller node receiving, via a message sent on a first segment of a control session path, identity information of at least one specific network termination node, or of an access node port of a specific line termination node used by the at least one specific network termination node; upon a lookup request message being sent to at least one repository node or repository functionality by the controller node, a lookup response message being sent by the at least one repository node or repository functionality, based on the identity information, the lookup response message comprising an indication of a specific external service edge node; and based on the indication of the specific external service edge node, set up or establishment of a second segment of the control session path towards the specific external service edge node being performed.

8 Claims, 2 Drawing Sheets (51) Int. Cl.
 *H04L 12/751* (2013.01)
 *H04L 29/08* (2006.01)

(56) References Cited

U.S. PATENT DOCUMENTS

| | | | |
|---|---|---|---|
| 2005/0289619 A1* | 12/2005 | Melby | H04N 21/24 725/95 |
| 2007/0089161 A1 | 4/2007 | Waris | |
| 2014/0313932 A1* | 10/2014 | Saltsidis | H04L 12/4633 370/254 |
| 2016/0088092 A1* | 3/2016 | Cardona-Gonzalez | H04W 4/60 709/227 |
| 2016/0164835 A1 | 6/2016 | Hoffmann et al. | |
| 2016/0373310 A1 | 12/2016 | Banikazemi et al. | |
| 2017/0026270 A1* | 1/2017 | Handige Shankar | H04L 43/18 |
| 2018/0255142 A1* | 9/2018 | Benantar | H04L 41/0806 |

* cited by examiner

ACCESS NETWORK WITH REMOTE ACCESS SERVERS

CROSS-REFERENCE TO PRIOR APPLICATIONS

This application is a U.S. National Phase Application under 35 U.S.C. § 371 of International Application No. PCT/EP2018/081283, filed on Nov. 15, 2018, and claims benefit to European Patent Application No. EP 17203471.2, filed on Nov. 24, 2017. The International Application was published in English on May 31, 2019 as WO 2019/101606 A1 under PCT Article 21(2).

FIELD

The present invention relates a method for an improved and simplified operation and architecture of a central office point of delivery and/or for the enhanced establishment and/or use of control sessions between network nodes connected to but external to the central office point of delivery within a broadband access network of a telecommunications network, wherein the central office point of delivery and/or the broadband access network comprises a controller node, wherein the broadband access network comprises—outside of the central office point of delivery—a plurality of external service edge nodes.

Furthermore, the present invention relates to a telecommunications network for an improved and simplified operation and architecture of a central office point of delivery and/or for the enhanced establishment and/or use of control sessions between network nodes connected to but external to the central office point of delivery within a broadband access network of a telecommunications network, wherein the central office point of delivery and/or the broadband access network comprises a controller node, wherein the broadband access network comprises—outside of the central office point of delivery—a plurality of external service edge nodes.

Additionally, the present invention relates to a system for an improved and simplified operation and architecture of a central office point of delivery and/or for the enhanced establishment and/or use of control sessions between network nodes connected to but external to the central office point of delivery within a broadband access network of a telecommunications network as part of the system, wherein the broadband access network comprises—outside of the central office point of delivery—a plurality of external service edge nodes.

Furthermore, the present invention relates to a controller node of a central office point of delivery of an inventive telecommunications network or of an inventive system.

BACKGROUND

The exchange of packetized information in broadband communication systems or telecommunications networks, both in fixed-line as in wireless communication systems (or fixed-line communication networks and mobile communication networks) has already grown dramatically and probably will also grow in the future due to the rapid spread of different data services in such communication networks.

The present invention generally relates to the area of aggregation networks linking remote or central access nodes to a backbone network or core network of the telecommunications network, e.g. broadband access network platforms such as 5G or CORD (Central Office Re-architected as a Data Center).

Typically in such architectures, multiple network termination ports are aggregated by an access node (e.g. a DSLAM device (Digital Subscriber Line Access Multiplexer) or a DPU device (Distribution Point Unit device) or an OLT (Optical Line Terminal) device) and interconnected to a subscriber termination device via a layer-2 infrastructure such as a datacenter fabric.

In these architectures, multiple network termination ports at subscriber sites are aggregated by an access node (e.g. DSLAM device or DPU device or OLT device) and interconnected to a subscriber session termination device via a layer-2 infrastructure such as a datacenter fabric.

Furthermore service specific service edges (usually BNGs-Broadband Network Gateways) are connected to the data center fabric. Usually, these devices (service specific service edges) have their own control plane which is not connected to the fabric and the (central office) point of delivery controller.

But in case of having a n:m relation between external access nodes and external service nodes (service BNG), a 1:1 relation is lost, such that a simple tunneling through the central office point of delivery is not a satisfactory solution.

SUMMARY

In an exemplary embodiment, the present invention provides a method for operation of a central office point of delivery and/or for establishment and/or use of control sessions between network nodes connected to but external to the central office point of delivery within a broadband access network of a telecommunications network. The central office point of delivery and/or the broadband access network comprises a controller node, at least one repository node or repository functionality and a plurality of line termination nodes, wherein a specific line termination node of the plurality of line termination nodes is connectable—using an access node port of the specific line termination node—to at least one specific network termination node of a plurality of network termination nodes. The broadband access network comprises—outside of the central office point of delivery—a plurality of external service edge nodes. Upon activation of the at least one specific network termination node connected to the specific line termination node, a control session is set up or is established, via the controller node, towards a specific external service edge node of the plurality of external service edge nodes, a first segment of a control session path being realized between, on one hand, the at least one specific network termination node or the specific line termination node, and, on the other hand, the controller node, and a second segment of the control session path being realized between the controller node and the specific external service edge node. The method comprises the following steps: in a first step, the controller node receives, via a message sent on the first segment of the control session path, identity information of the at least one specific network termination node, or of the access node port of the specific line termination node used by the at least one specific network termination node; in a second step, subsequent to the first step, upon a lookup request message being sent to the at least one repository node or repository functionality by the controller node, a lookup response message is sent by the at least one repository node or repository functionality, based on the identity information of the at least one specific network termination node, or of the access node port of the specific line termination node used by the at least one specific network termination node, the lookup response message comprising an indication of the specific external service edge node; and in a third step, subsequent to the second step and based on the indication of the specific external service edge node, the set up or establishment of the second segment of the control session path towards the specific external service edge node is performed.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Exemplary embodiments of the present invention provide a technically simple, effective and cost effective solution for an improved and simplified operation and architecture of a central office point of delivery and/or for the enhanced establishment and/or use of control sessions between network nodes connected to but external to the central office point of delivery within a broadband access network of a telecommunications network,
wherein the central office point of delivery and/or the broadband access network comprises a controller node, at least one repository node or repository functionality and a plurality of line termination nodes, wherein a specific line termination node of the plurality of line termination nodes is connectable—using an access node port of the specific line termination node—to at least one specific network termination node of a plurality of network termination nodes, wherein the broadband access network comprises—outside of the central office point of delivery—a plurality of external service edge nodes,
wherein—upon activation of the specific network termination node, being connected to the specific line termination node—a control session is set up or is established, via the controller node, towards a specific external service edge node of the plurality of external service edge nodes. Exemplary embodiments of the present invention further provide a corresponding telecommunications network, a corresponding system, and a corresponding central office point of delivery, and a corresponding controller node.

In an exemplary embodiment, the present invention provides a method for an improved and simplified operation and architecture of a central office point of delivery and/or for the enhanced establishment and/or use of control sessions between network nodes connected to but external to the central office point of delivery within a broadband access network of a telecommunications network,
wherein the central office point of delivery and/or the broadband access network comprises a controller node, at least one repository node or repository functionality and a plurality of line termination nodes, wherein a specific line termination node of the plurality of line termination nodes is connectable—using an access node port of the specific line termination node—to at least one specific network termination node of a plurality of network termination nodes, wherein the broadband access network comprises—outside of the central office point of delivery—a plurality of external service edge nodes,
wherein—upon activation of the specific network termination node, being connected to the specific line termination node—a control session is set up or is established, via the controller node, towards a specific external service edge node of the plurality of external service edge nodes, a first segment of a control session path being realized between, on the one hand, the specific network termination node or the specific line termination node, and, on the other hand, the controller node, and a second segment of the control session path being realized between the controller node and the specific external service edge node, wherein the method comprises the following steps:

in a first step, the controller node receives, via a message sent on the first segment of the control session path, an identity information of the specific network termination node, or of the access node port of the specific line termination node used by the specific network termination node, in a second step, subsequent to the first step, upon a lookup request message being sent to the repository node or repository functionality by the controller node, a lookup response message is sent by the repository node or repository functionality, based on the identity information of the specific network termination node, or of the access node port of the specific line termination node used by the specific network termination node, the lookup response message comprising an indication of the specific external service edge node, in a third step, subsequent to the second step and based on the indication of the specific external service edge node, the set up or establishment of the second segment of the control session path towards the specific external service edge node is performed.

It is thereby advantageously possible according to the present invention to provide a solution to adapt external service edges and control connectivity between access ports and external service edges. In the context of the present invention, the term "external service edge node" means a service edge node that is logically external to the central office point of delivery, independently of whether the physical implementation of that service edge node is physically located on the same site or location of the central office point of delivery.

Usually in SDN-based architectures (software defined network architectures) multiple controllers are orchestrated across boundaries. This cannot be applied to legacy devices such like legacy access nodes (i.e. non-SDN-based)—often referred to as network termination nodes or line termination nodes—and legacy external service edge nodes (i.e. non-SDN-based), which are often referred to as BNGs. Usually these control connections need to be in real time.

In conventionally known telecommunications networks (i.e. in the context of existing legacy architectures), a point-to-point (p2p) control plane connection between an access node (or network termination nodes or line termination nodes) and a service edge or (external) service edge nodes is typically used. This is mainly being used for port-up/down notifications and transmission of available bandwidth (as e.g. the current synch rate in the copper access line).

However, in case of using an aggregation architecture with a central office point of delivery—especially with a spine/leaf switching fabric—as aggregation and keeping the existing legacy service edge, the point-to-point control connections (p2p control connection) are cut (between the access node and the service edge node, especially in case that the service edge node is external to the central office point of delivery).

In case that a 1:1 relation (or a point-to-point relation) is usable between the access nodes and external service edge nodes (e.g. BNG), it would be possible to tunnel the control session through the central office point of delivery (and its switching fabric), e.g. via routing the ANCP session over, e.g., the TCP/IP protocol. However, with the point-to-point control connections (between the access node and the service edge node, especially in case that the service edge node is external to the central office point of delivery) being cut, such a tunneling is not possible any more: In case of having an n:m relation between external access nodes and external service nodes (service BNG) the 1:1 relation is lost.

According to the present invention, it is advantageously possible to avoid these drawbacks and to provide a flexible fabric setup (within the central office point of delivery) between external access nodes and external service nodes. It is advantageous according to the present invention that a control session is set up or established (using the controller node) between the external access nodes and the external service nodes (i.e. between a line termination node/an access node port of a line termination node, on the one hand, and an external service edge node, on the other hand), wherein the control session comprises a first segment of a control session path (being realized between, on the one hand, the specific network termination node or the specific line termination node, and, on the other hand, the controller node), and a second segment of the control session path (being realized between the controller node and the specific external service edge node). In the context of the present invention, the controller node is also called a back to back access control agent. This controller node (or back to back access control agent), e.g., translates port id schema, holds port states and provides a dedicated forwarding based on control policies.

According to the present invention, in a first step, the controller node (or the back to back access control agent) receives, via a message sent on the first segment of the control session path, an identity information of the specific network termination node, or of the access node port of the specific line termination node used by the specific network termination node. In a second step, subsequent to the first step, upon a lookup request message being sent to the repository node or repository functionality by the controller node, a lookup response message is sent by the repository node or repository functionality, based on the identity information of the specific network termination node, or of the access node port of the specific line termination node used by the specific network termination node, the lookup response message comprising an indication of the specific external service edge node. In a third step, subsequent to the second step and based on the indication of the specific external service edge node, the set up or establishment of the second segment of the control session path towards the specific external service edge node is performed.

The telecommunications network according to the present invention may be a fixed-line telecommunications network or a mobile communication network but preferably is a telecommunications network having both aspects (or parts) of a fixed-line telecommunications network (or being a fixed-line telecommunications network in such parts) and aspects (or parts) of a mobile communication network (or being a mobile communication network in such parts); such networks are also known under the term fixed-mobile-convergence networks (FMC networks).

Furthermore, it is advantageously possible and preferred according to the present invention that the controller node comprises a first controller part and a second controller part (or back to back access control agent), the first segment of the control session path corresponding to a control connection between the first controller part and the specific network termination node or the specific line termination node, and the second segment of the control session path corresponding to a control connection between the second controller part and the specific external service edge node, wherein especially the first controller part and the second controller part form a back to back controller agent, wherein such a back to back controller agent either corresponds to the controller node or wherein such a back to back controller agent is part of the controller node.

Via the controller node comprising a first controller part and a second controller part, it is advantageously possible to comparatively easily realize an n:m relation between external access nodes and external service nodes.

Furthermore, and according to an alternative embodiment of the present invention, it is preferred that—upon activation of a further specific network termination node, being connected to the specific line termination node or a further specific line termination node—a further control session is set up or is established, via the controller node, towards the specific external service edge node, a further first segment of a further control session path being realized between, on the one hand, the further specific network termination node or the specific line termination node or the further specific line termination node, and, on the other hand, the controller node, and a further second segment of the further control session path being realized between the controller node and the specific external service edge node, wherein the second segment of the control session path and the further second segment of the further control session path are integrated in one control connection between the specific external service edge node and the controller node, wherein this control connection is fed using both the first segment of the control session path and the further first segment of the further control session path.

Thereby, it is advantageously possible that each external service node (such as, e.g., a BNG) has only one control connection even though a plurality of control connections exists on the access side, i.e. this second segment of the control session path corresponds to the second segment of the control session path of both the control session and the further control session—or put otherwise: the connection of the external service node is fed using multiple connections on the access side. The controller node (or back to back access control agent) corresponds to an entity in between that provides the switching and/or cross-connecting of these control sessions.

According to a further preferred embodiment of the present invention, the first and second part of the controller node, with respect to the first, further first and second segment of the control session path:

translate identity information of the specific network termination node, or of the access node port of the specific line termination node used by the specific network termination node, and/or hold port states and/or provide a dedicated forwarding of messages based on control policies, especially message filtering and/or message transformation, uses a first control protocol on the first segment of the control session path or of the further first segment of the further control session path and a different second protocol on the second segment of the control session path.

Thereby, it is advantageously possible to easily and effectively realize exemplary embodiments of the inventive method of an improved and simplified operation and architecture of a central office point of delivery. It is especially advantageous that the present invention is able to be implemented using the usual Access Node Control Protocol (ANCP), e.g. on both sides (or paths) of the control session, or only on one side (or paths) of the control session (in this case requiring a translation, typically within the controller node, between the used protocols); in any case, the principle according to the present invention is not limited to the use of ANCP. As an example for message filtering, the transmission of information regarding the attainable data rate is mentioned: Information regarding the attainable data rate may be transmitted on the first segment of the control session path but may be filtered out (removed or deleted or not forwarded) to the external service edge node on the second segment of the control session path.

According to a further embodiment of the present invention, the plurality of external service edge nodes are legacy network nodes or non-software defined network-based network nodes, and/or wherein the plurality of line termination nodes and/or the plurality of network termination nodes are legacy network nodes or non-software defined network-based network nodes, and/or wherein the controller node, especially comprising or corresponding to a back to back controller agent, is logically placed between such legacy network nodes or non-software defined network-based network nodes, especially both towards the plurality of external service edge nodes, and towards the plurality of line termination nodes and/or the plurality of network termination nodes.

Via the plurality of external service edge nodes being legacy network nodes and/or the plurality of line termination nodes and/or the plurality of network termination nodes being legacy network nodes, it is advantageously possible to integrate and reuse those nodes in an inventive telecommunications network.

According to still a further embodiment of the present invention, the repository node or repository functionality comprises or is able to access relevant pieces of information, especially the corresponding pieces of identity information, regarding all network termination nodes of the plurality of network termination nodes within the broadband access network or within the central office point of delivery, and especially identification information regarding the plurality of external service edge nodes.

Via the controller node cooperating with the repository node or repository functionality, it is advantageously possible to realize exemplary embodiments of the inventive method, and provide for an effective realization of control sessions.

Furthermore, the present invention relates to a telecommunications network for an improved and simplified operation and architecture of a central office point of delivery and/or for the enhanced establishment and/or use of control sessions between network nodes connected to but external to the central office point of delivery within a broadband access network of the telecommunications network, wherein the central office point of delivery and/or the broadband access network comprises a controller node, at least one repository node or repository functionality and a plurality of line termination nodes, wherein a specific line termination node of the plurality of line termination nodes is connectable—using an access node port of the specific line termination node—to at least one specific network termination node of a plurality of network termination nodes, wherein the broadband access network comprises—outside of the central office point of delivery—a plurality of external service edge nodes, wherein the telecommunications network is configured such that—upon activation of the specific network termination node, being connected to the specific line termination node—a control session is set up or is established, via the controller node, towards a specific external service edge node of the plurality of external service edge nodes, a first segment of a control session path being realized between, on the one hand, the specific network termination node or the specific line termination node, and, on the other hand, the controller node, and a second segment of the control session path being realized between the controller node and the specific external service edge node, wherein the telecommunications network is further configured such that:

the controller node receives, via a message sent on the first segment of the control session path, an identity information of the specific network termination node, or of the access node port of the specific line termination node used by the specific network termination node, upon a lookup request message being sent to the repository node or repository functionality by the controller node, a lookup response message is sent by the repository node or repository functionality, based on the identity information of the specific network termination node, or of the access node port of the specific line termination node used by the specific network termination node, the lookup response message comprising an indication of the specific external service edge node, based on the indication of the specific external service edge node, the set up or establishment of the second segment of the control session path towards the specific external service edge node is performed.

Furthermore, the present invention relates to a system for an improved and simplified operation and architecture of a central office point of delivery and/or for the enhanced establishment and/or use of control sessions between network nodes connected to but external to the central office point of delivery within a broadband access network of a telecommunications network as part of the system, wherein the central office point of delivery and/or the broadband access network comprises a controller node, at least one repository node or repository functionality and a plurality of line termination nodes, wherein a specific line termination node of the plurality of line termination nodes is connectable—using an access node port of the specific line termination node—to at least one specific network termination node of a plurality of network termination nodes, wherein the broadband access network comprises—outside of the central office point of delivery—a plurality of external service edge nodes,
wherein the system is configured such that—upon activation of the specific network termination node, being connected to the specific line termination node—a control session is set up or is established, via the controller node, towards a specific external service edge node of the plurality of external service edge nodes, a first segment of a control session path being realized between, on the one hand, the specific network termination node or the specific line termination node, and, on the other hand, the controller node, and a second segment of the control session path being realized between the controller node and the specific external service edge node, wherein the system is further configured such that:

the controller node receives, via a message sent on the first segment of the control session path, an identity information of the specific network termination node, or of the access node port of the specific line termination node used by the specific network termination node,
 upon a lookup request message being sent to the repository node or repository functionality by the controller node, a lookup response message is sent by the repository node or repository functionality, based on the identity information of the specific network termination node, or of the access node port of the specific line termination node used by the specific network termination node, the lookup response message comprising an indication of the specific external service edge node,
 based on the indication of the specific external service edge node, the set up or establishment of the second segment of the control session path towards the specific external service edge node is performed.

Additionally, the present invention relates to a controller node of a central office point of delivery of an inventive telecommunications network or of an inventive system, the controller node comprising or corresponding to a back to back controller agent, and/or to the use of a controller node of a central office point of delivery in an inventive telecommunications network or in an inventive system or in an inventive method, the controller node comprising or corresponding to a back to back controller agent.

Still additionally, the present invention relates to a program comprising a computer readable program code which, when executed on a computer and/or on a central office point of delivery and/or on a controller node of a central office point of delivery, or in part on a central office point of delivery and/or in part on a controller node of the central office point of delivery, causes the computer and/or the central office point of delivery and/or the controller node of the central office point of delivery to perform an inventive method.

Furthermore, the present invention relates to a computer-readable medium comprising instructions which when executed on a computer and/or on a central office point of delivery and/or on a controller node of a central office point of delivery, or in part on a central office point of delivery and/or in part on a controller node of the central office point of delivery, causes the computer and/or the central office point of delivery and/or the controller node of the central office point of delivery to perform an inventive method.

These and other characteristics, features and advantages of the present invention will become apparent from the following detailed description, taken in conjunction with the accompanying drawings, which illustrate, by way of example, principles of the invention. The description is given for the sake of example only, without limiting the scope of the invention. The reference figures quoted below refer to the attached drawings.

The present invention will be described with respect to exemplary embodiments and with reference to certain drawings but the invention is not limited thereto but only by the claims. The drawings described are schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Figure 1:
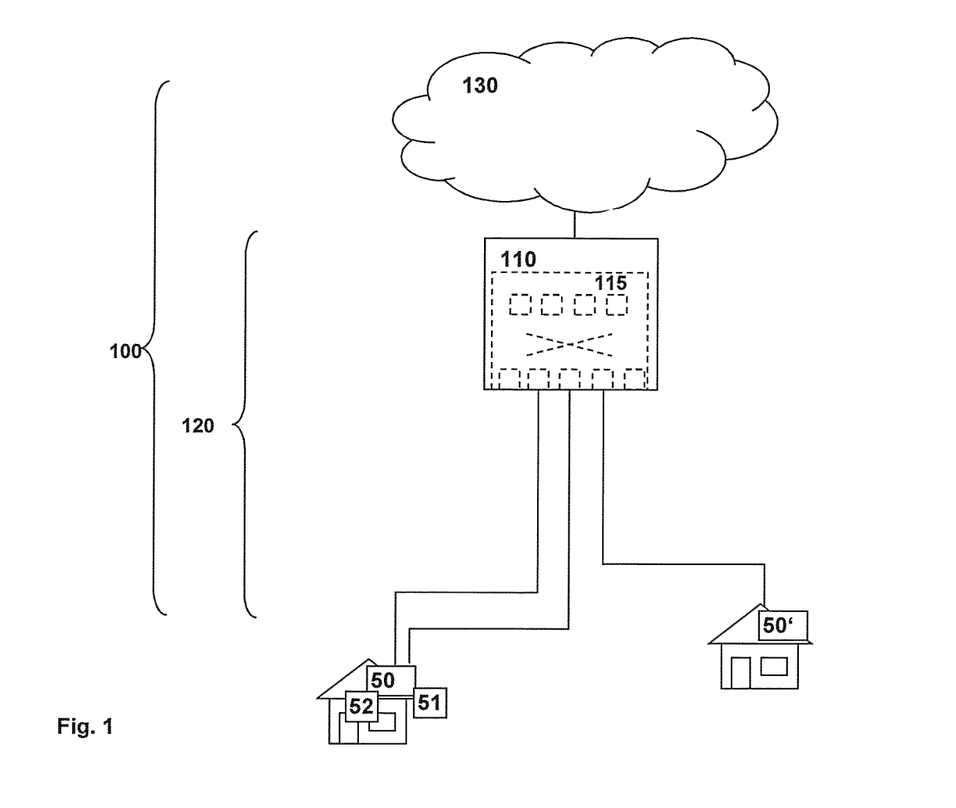
FIG. 1 schematically illustrates a telecommunications network according to the present invention, having a broadband access network with a central office point of delivery.

In FIG. 1, a telecommunications network 100 according to the present invention is schematically shown, having—preferably—at least a fixed line part. A mobile (or cellular) part may be present as well, as part of the telecommunications network 100. User equipments or client devices 51, 52 are connected to the telecommunications network 100 via a (broadband) access network 120. The telecommunications network 100 comprises, especially as part of the broadband access network 120, at least one logical or physical central office point of delivery 110 that is preferably realized within a data center and that is especially handling different access requirements, especially different access possibilities, of the client devices 51, 52 to network functionalities provided by the telecommunications network 100 or via the telecommunications network 100. The client devices 51, 52 are typically connected to the logical or physical central office point of delivery 110 via a customer premises equipment device 50, 50' or via a customer premises equipment functionality that may be built in the client devices 51, 52. Preferably but not necessarily, the central office point of delivery 110 comprises a switching fabric 115 comprising a plurality of spine network nodes and typically also a plurality of leaf network nodes which are not explicitly represented in FIG. 1.

Figure 3:
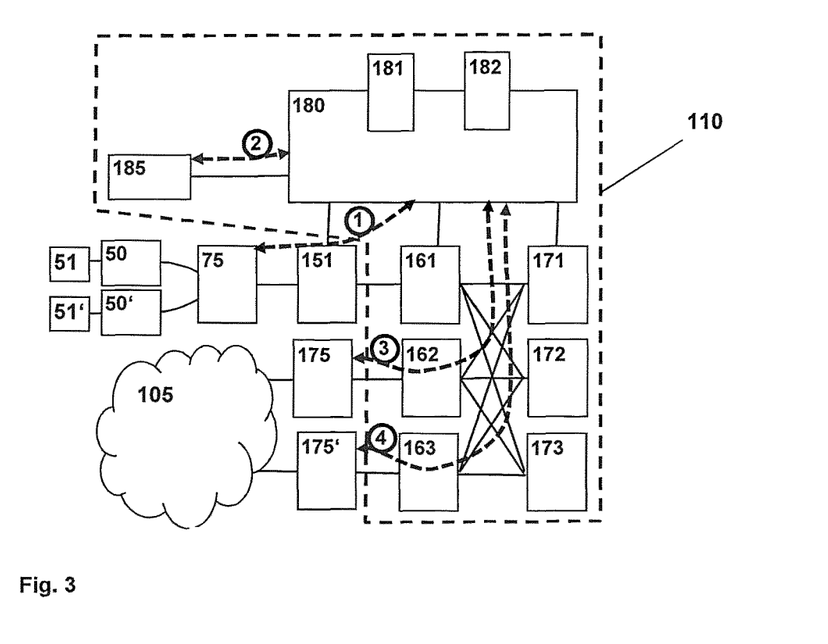
FIG. 3 schematically illustrates a part of a broadband access network of an inventive telecommunications network with a central office point of delivery and a plurality of service edge nodes.

FIG. 3 schematically illustrates a part of a broadband access network 120 of an inventive telecommunications network 100 with a central office point of delivery 110 and a plurality of service edge nodes 175, 175'. The central office point of delivery 110 is part of the broadband access network 120, wherein the represented part of the telecommunications network 100 comprises—besides a controller node 180 and at least one repository node or repository functionality 185—a line termination nodes 151 (that represents a plurality of line termination nodes that are typically present in the broadband access network). Typically, each of the line termination nodes has one or a plurality of access node ports. In the example represented in FIG. 3, the broadband access network 120 comprises only one line termination node 151. The (typically present plurality of) line termination node(s) may be provided to support different access technologies to a home gateway or customer premises equipment 50, 50'. In the exemplary embodiment shown in FIG. 3, the line termination node 151 may be realized as a line termination node supporting to be connected, e.g., to an optical network, especially a passive optical network (PON) or point-to-point fiber, typically a so-called optical line terminal (OLT) or optical line terminal device. In such a situation, a client device 51 is connected to the telecommunications network 100 (i.e. to the (also called specific) line termination node 151) via the customer premises equipment 50 (or home gateway device 50) and a network termination node 75. The functionality of the customer premises equipment 50 (or home gateway device 50) and the functionality of the network termination node 75 may also be integrated in one device or "box". Even the functionality of the client device 51, the functionality of the customer premises equipment 50 (or home gateway device 50) and the functionality of the network termination node 75 may be integrated in one device or "box". Nevertheless, these functionalities are represented in FIG. 3 as separated functionalities. In FIG. 3, a second home gateway device 50' (or second customer premises equipment 50') is shown (and also a second client device 51'). However, only one network termination node 75 (i.e. a specific network termination node) is shown. However, also other line termination nodes may be connected to corresponding network termination nodes and customer premises equipments (that are not necessarily represented in FIG. 3).

In the context of the present invention, in order to separate the "specific" or considered entities from the other entities of the same kind within the broadband access network 120, the line termination node 151 is also called the specific line termination node 151, the network termination node 75 connected to the line termination node 151 is also called the specific network termination node 75, and the customer premises equipment 50 connected to the specific network termination node 75 is also called the specific customer premises equipment.

In case of the line termination nodes having a plurality of access node ports, also a plurality of network termination nodes are able to be connected to one line termination node and/or (in case that a network termination node has a plurality of ports) also a plurality of customer premises equipments are able to be connected to one network termination node.

According to the present invention, a method for an improved and simplified operation of a central office point of delivery 110 and/or for the enhanced establishment and/or use of control sessions between network nodes connected to but external to the central office point of delivery 110 within a broadband access network 120 of a telecommunications network 100 as well as a corresponding architecture of a central office point of delivery 110, especially of the controller node 180, is provided. Especially, this serves to the more effective establishment and/or the more effective use of control sessions between network nodes connected to but external to the central office point of delivery 110.

The central office point of delivery 110 and/or the broadband access network 120 comprises a controller node 180, at least one repository node or repository functionality 185, a plurality of line termination nodes 151, and a plurality of external service edge nodes 175, 175', wherein a specific line termination node 151 of the plurality of line termination nodes is connectable—using an access node port of the specific line termination node 151—to typically only one specific network termination node 75 (of a plurality of network termination nodes). The broadband access network 120 comprises—outside of the central office point of delivery 110—a plurality of external service edge nodes 175, 175'.

According to the present invention, upon activation of the specific network termination node 75, being connected to the specific line termination node 151—a control session is set up or is established, via the controller node 180, towards a specific external service edge node 175 of the plurality of external service edge nodes 175, 175', a first segment of a control session path being realized between, on the one hand, the specific network termination node 75 or the specific line termination node 151, and, on the other hand, the controller node 180, and a second segment of the control session path being realized between the controller node 180 and the specific external service edge node 175, wherein the method comprises the following steps:

- in a first step, the controller node receives, via a message sent on the first segment of the control session path, an identity information of the specific network termination node 75, or of the access node port of the specific line termination node 151 used by the specific network termination node,
- in a second step, subsequent to the first step, upon a lookup request message being sent to the repository node or repository functionality 185 by the controller node 180, a lookup response message is sent by the repository node or repository functionality 185, based on the identity information of the specific network termination node 75, or of the access node port of the specific line termination node 151 used by the specific network termination node 75, the lookup response message comprising an indication of the specific external service edge node 175,
- in a third step, subsequent to the second step and based on the indication of the specific external service edge node 175, the set up or establishment of the second segment of the control session path towards the specific external service edge node 175 is performed.

Hence, FIG. 3 schematically shows a typical setup of a central office point of delivery 110. The specific customer premises equipment 50 (or specific home gateway 50) is connected via the specific optical network terminal (or the specific network termination node 75) and the specific optical line terminal (OLT MAC) (or the specific line termination node 151) to a leaf switch 161 (of a plurality of leaf switches 161, 162, 163) which is dual-homed at a plurality of spine switches 171, 172, 173. In the exemplary embodiment shown in FIG. 3, the functionality of a service edge node is realized by the plurality of external service edge nodes 175, 175'. Hence, the spine switch functionality is in this case separated from the service edge functionality and vice versa, i.e. the service edge function or functionality resides in a different node inside, but according to the present invention external to the central office point of delivery (than the spine switch functionality). The controller or controller node 180 for the access domain—which controls the central office point of delivery 110—has an access domain repository (or repository node or repository functionality) 185 (so-called A4 repository) which holds all devices within the broadband access network, including the connected optical network terminal devices (network termination nodes) and/or home gateways 50, 50'.

Besides the repository node or repository functionality 185, a database for alarms and anomalies may be realized. This holds the history even in case of that the A4 repository (or repository node or repository functionality 185) already lost the session context (of a connection session) due to session termination.

E.g., on the access side, an MSAN (as a network termination node 75) is shown with two different access lines to two dedicated external service edge nodes 175, 175' (such as, e.g. BNGs). In current central office point of delivery architectures OLT-MAC (GPON Access Nodes) are, e.g., connected via leaf spine fabric architecture.

External access nodes are connected via optical ports to the OLT-MAC or the leaf switch. The data plane is typically connected via point-to-point (p2p) connections supported by various protocols e.g. like VLAN, VxLAN, MPLS PW, IPv6 segment routing.

In a dynamic central office point of delivery environment, the back to back agent (or controller node 180) receives port notifications from access nodes request based on port ID from the POD repository access port a legacy service edge is connected to. This information is conveyed via control plane (designated in FIG. 3 by an encircled reference numeral 1) towards the controller. The message contains a port ID. Based on that port ID, the access facing part of the back to back agent (controller node 180) requests from the repository 185 a lookup for connectivity (designated in FIG. 3 by an encircled reference numeral 2). The response triggers the controller to set the data path to either the first external service edge node 175 or the second external service edge node 175' (BNG1 respectively BNG2, designated in FIG. 3 by encircled reference numerals 3 or 4). But the respective external service edge node (e.g. a BNG) also needs to have Port information (e.g. Bandwidth, status, encapsulation etc.). For that case, the central office point of delivery back to back controller (controller node 180) translates the message from the first segment of the control session either into the second segment of the control session towards the first or the second external service edge node 175, 175'. It translates port identifiers, Layer 2 connectivity parameters and in case of different protocols also TLVs (Type Length Value (data field)). The external service edge node 175, 175' always sees only one control connection while the intermediate agent (controller node 180) assures the multiplexing and de-multiplexing of the control messages, typically of the ANCP protocol.

Figure 2:
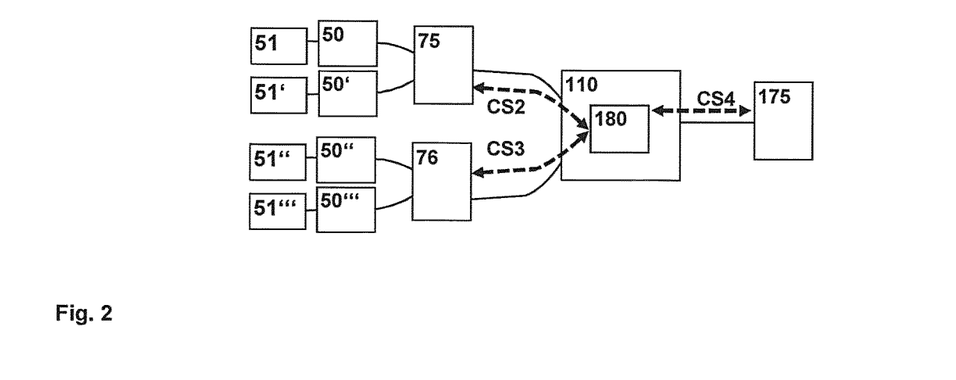
FIG. 2 schematically illustrates a part of a broadband access network of an inventive telecommunications network with a central office point of delivery, a plurality of access nodes, and a service edge node.

In FIG. 2, a part of a broadband access network 120 of an inventive telecommunications network 100 with a central office point of delivery 110, a plurality of access nodes (or network termination nodes) 75, 76, and a service edge node 175 is schematically shown. A first network termination node 75 and a second network termination node 76 are connected to the central office point of delivery 110. A first customer premises equipment 50 and a second customer premises equipment 50' (together with respective client devices 51, 51') are connected to the first network termination node 75, and a third customer premises equipment 50" and a fourth customer premises equipment 50''' (together with respective client devices 51", 51''') are connected to the second network termination node 76.

As already stated, upon activation of the first network termination node 75 (or specific network termination node 75), being connected to a corresponding line termination node 151 [not shown in FIG. 2], a control session is set up or is established (via the controller node 180), towards the specific external service edge node 175. The control session comprises
a first segment CS2 of a control session path, being realized between, on the one hand, the first network termination node 75 (or specific network termination node 75) [or the corresponding specific line termination node 151], and, on the other hand, the controller node 180, and a second segment CS4 of the control session path, being realized between the controller node 180 and the specific external service edge node 175.

In the situation represented in FIG. 2, additionally upon activation of the second network termination node 76 (or further specific network termination node 76), being connected either to the specific line termination node 151 or a further specific line termination node, a further control session is set up or is established (via the controller node 180), towards the specific external service edge node 175. The further control session comprises
a further first segment CS3 of a further control session path, being realized between, on the one hand, the second network termination node 76 (or further specific network termination node 76) [or the corresponding specific line termination node 151 or the further specific line termination node], and, on the other hand, the controller node 180, and,
a further second segment (also being designated by CS4) of the further control session path, being realized between the controller node 180 and the specific external service edge node 175.

The second segment of the control session path and of the further second segment of the further control session path are integrated in one control connection CS4 between the specific external service edge node 175 and the controller node 180 (or second part 182 of the controller node 180), wherein this control connection CS4 is fed using both the first segment CS2 of the control session path and the further first segment CS3 of the further control session path.

According to the present invention, the central office point of delivery back to back controller agent is especially able to deal with various control protocols. So, a translation between different control protocols of different segments is feasible; i.e. CS2 to CS4 and/or CS3 to CS4—hence, different protocols can be used on the first segment of a control session path compared to the second segment of a control session path, and the principles are not limited to solely using ANCP (on both segments).

The present invention advantageously:
extends a central office point of delivery 110 and its internal switching fabric controlling multiple external service edges or external service edge nodes,
provides the possibility that an external service gateway is connected to a switching fabric (central office point of delivery) and integrated in the fabric control plane,
provides the possibility that an external service gateway which is connected to a switching fabric by using segmented pseudo wires and/or segment routing,
provides the possibility that a control instance is placed between non-SDN-based access nodes and non-SDN-based external service gateways, and
provides a back to back control agent which controls, distributes and transforms messages according to defined rules from access nodes and external service gateways (external service edge nodes).

Hence, according to the present invention,
a central office point of delivery and its internal switching fabric is extended to control multiple external service edges,
a control instance is placed between non SDN based access nodes and non SDN based external service gateways,
a back to back control agent controls, distributes and transforms messages (especially control messages) according defined rules from access nodes and external service gateways.

Consequently, according to the present invention, a system comprising a switching fabric and connecting multiple access nodes to a multitude of service edge nodes is provided, where—depending on the dynamically learned subscriber session type—each subscriber session may be directed in user plane to a different service edge, and where in order to allow the accompanying control plane session is in parallel connected to the same service edge via a back-to-back control plane agent multiplexing and demultiplexing the sessions between the multitude of access nodes and BNGs where preferably the BNG only has one control session towards this back-to back agent effectively making the multitude of access nodes look like a single access node.

Furthermore, an implementation is provided where the back to back agent (controller node 180) bridges multiple ANCP sessions. Additionally, an implementation is provided where the back to back agent (controller node 180) translates multiple control protocol sessions e.g. OF-ANCP, SNMP-ANCP and vice versa. Additionally, an implementation is provided which is able to control dynamic message behavior which can shape and/or limit and/or control dynamic message flows (e.g. in case of SRA, FRA in DSL).

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

ABBREVIATIONS

BNG Broadband Network Gateway
FRA Fast Rate Adaptation (specific for G.fast)
MSAN Multi Service Access Node
MPLS Multi Protocol Label Switching
OLT-MAC Optical Line Termination (MAC=Dataplane)
PFS "Plattformsteuerung"; Policy Controller/AAA
POD Point Of Delivery
PPP Point-to-Point Protocol
PW Pseudo Wire
SDN Software Defined Network
SRA Seamless Rate Adaptation (specific for ADSL, VDSL)
TLV Type Length Value (Data field)

The invention claimed is:

1. A method for operation of a central office point of delivery and/or for establishment and/or use of control sessions between network nodes connected to but external to the central office point of delivery within a broadband access network of a telecommunications network,
    wherein the central office point of delivery and/or the broadband access network comprises a controller node, at least one repository node or repository functionality and a plurality of line termination nodes, wherein a specific line termination node of the plurality of line termination nodes is connectable—using an access node port of the specific line termination node to at least one specific network termination node of a plurality of network termination nodes,
    wherein the broadband access network comprises—outside of the central office point of delivery—a plurality of external service edge nodes,
    wherein—upon activation of the at least one specific network termination node connected to the specific line termination node—a control session is set up or is established, via the controller node, towards a specific external service edge node of the plurality of external service edge nodes, a first segment of a control session path being realized between, on one hand, the at least one specific network termination node or the specific line termination node, and, on the other hand, the controller node, and a second segment of the control session path being realized between the controller node and the specific external service edge node, wherein the method comprises the following steps:
    in a first step, the controller node receives, via a message sent on the first segment of the control session path, identity information of the at least one specific network termination node, or of the access node port of the specific line termination node used by the at least one specific network termination node;
    in a second step, subsequent to the first step, upon a lookup request message being sent to the at least one repository node or repository functionality by the controller node, a lookup response message is sent by the at least one repository node or repository functionality, based on the identity information of the at least one specific network termination node, or of the access node port of the specific line termination node used by the at least one specific network termination node, the lookup response message comprising an indication of the specific external service edge node; and
    in a third step, subsequent to the second step and based on the indication of the specific external service edge node, the set up or establishment of the second segment of the control session path towards the specific external service edge node is performed.

2. The method according to claim 1, wherein the controller node comprises a first controller part and a second controller part, the first segment of the control session path corresponding to a control connection between the first controller part and the at least one specific network termination node or the specific line termination node, and the second segment of the control session path corresponding to a control connection between the second controller part and the specific external service edge node, wherein the first controller part and the second controller part form a back to back controller agent, wherein the back to back controller agent corresponds to the controller node or is part of the controller node.

3. The method according to claim 2, wherein—upon activation of a further specific network termination node connected to the specific line termination node or a further specific line termination node—a further control session is set up or is established, via the controller node, towards the specific external service edge node, a further first segment of a further control session path being realized between, on the one hand, the further specific network termination node or the specific line termination node or the further specific line termination node, and, on the other hand, the controller node, and a further second segment of the further control session path being realized between the controller node and the specific external service edge node, wherein the second segment of the control session path and the further second segment of the further control session path are integrated in one control connection between the specific external service edge node and the controller node, wherein this control connection is fed using both the first segment of the control session path and the further first segment of the further control session path.

4. The method according to claim 3, wherein the first and second parts of the controller node, with respect to the first, further first and second segments of the control session path:
  translate identity information of the at least one specific network termination node, or of the access node port of the specific line termination node used by the at least one specific network termination node;
  hold port states;
  provide dedicated forwarding of messages based on control policies, including message filtering and/or message transformation; and/or
  use a first control protocol on the first segment of the control session path or of the further first segment of the further control session path and a different second protocol on the second segment of the control session path.

5. The method according to claim 2, wherein the plurality of external service edge nodes are legacy network nodes or non-software defined network-based network nodes; and/or
  wherein the plurality of line termination nodes and/or the plurality of network termination nodes are legacy network nodes or non-software defined network-based network nodes; and/or
  wherein the controller node is logically placed between the legacy network nodes or non-software defined network-based network nodes, towards the plurality of external service edge nodes, and towards the plurality of line termination nodes and/or the plurality of network termination nodes.

6. The method according to claim 1, wherein the at least one repository node or repository functionality comprises or is configured to access identification information regarding the plurality of external service edge nodes.

7. A telecommunications system, comprising:
  a controller node;
  at least one repository node or repository functionality; and
  a plurality of line termination nodes, wherein a specific line termination node of the plurality of line termination nodes is connectable—using an access node port of the specific line termination node—to at least one specific network termination node of a plurality of network termination nodes;
  a broadband access network comprising a central office point of delivery and a plurality of external service edge nodes outside of the central office point of delivery;
  wherein the system is configured such that—upon activation of the at least one specific network termination node connected to the specific line termination node—a control session is set up or is established, via the controller node, towards a specific external service edge node of the plurality of external service edge nodes, a first segment of a control session path being realized between, on the one hand, the at least one specific network termination node or the specific line termination node, and, on the other hand, the controller node, and a second segment of the control session path being realized between the controller node and the specific external service edge node;
  wherein the controller node is configured to receive, via a message sent on the first segment of the control session path, identity information of the at least one specific network termination node, or of the access node port of the specific line termination node used by the at least one specific network termination node;
  wherein the at least one repository node or repository functionality is configured, upon a lookup request message being sent to the at least one repository node or repository functionality by the controller node, to send a lookup response message, based on the identity information of at least one the specific network termination node, or of the access node port of the specific line termination node used by the at least one specific network termination node, the lookup response message comprising an indication of the specific external service edge node;
  wherein set up or establishment of the second segment of the control session path towards the specific external service edge node is based on the indication of the specific external service edge node.

8. One or more non-transitory computer-readable mediums having processor-executable instructions stored thereon for operation of a central office point of delivery and/or for establishment and/or use of control sessions between network nodes connected to but external to the central office point of delivery within a broadband access network of a telecommunications network,
  wherein the central office point of delivery and/or the broadband access network comprises a controller node, at least one repository node or repository functionality and a plurality of line termination nodes, wherein a specific line termination node of the plurality of line termination nodes is connectable—using an access node port of the specific line termination node—to at least one specific network termination node of a plurality of network termination nodes,
  wherein the broadband access network comprises—outside of the central office point of delivery—a plurality of external service edge nodes,
  wherein—upon activation of the at least one specific network termination node connected to the specific line termination node—a control session is set up or is established, via the controller node, towards a specific external service edge node of the plurality of external service edge nodes, a first segment of a control session path being realized between, on one hand, the at least one specific network termination node or the specific line termination node, and, on the other hand, the controller node, and a second segment of the control session path being realized between the controller node and the specific external service edge node, wherein the processor-executable instructions, when executed, facilitate the following steps:

in a first step, the controller node receives, via a message sent on the first segment of the control session path, identity information of the at least one specific network termination node, or of the access node port of the specific line termination node used by the at least one specific network termination node;

in a second step, subsequent to the first step, upon a lookup request message being sent to the at least one repository node or repository functionality by the controller node, a lookup response message is sent by the at least one repository node or repository functionality, based on the identity information of the at least one specific network termination node, or of the access node port of the specific line termination node used by the at least one specific network termination node, the lookup response message comprising an indication of the specific external service edge node; and in a third step, subsequent to the second step and based on the indication of the specific external service edge node, the set up or establishment of the second segment of the control session path towards the specific external service edge node is performed.

* * * * *